US006726173B2

(12) United States Patent
Hettinger et al.

(10) Patent No.: US 6,726,173 B2
(45) Date of Patent: Apr. 27, 2004

(54) MICRO-VALVE

(75) Inventors: Christoph Hettinger, Ingelfingen (DE); Ernst Hochholdinger, Niedernhall (DE)

(73) Assignee: Bukert Werke GmbH & Co., Ingelfinger (DE)

( * ) Notice: Subject to any disclaimer, the term of this patent is extended or adjusted under 35 U.S.C. 154(b) by 0 days.

(21) Appl. No.: 10/221,316

(22) PCT Filed: Jan. 11, 2002

(86) PCT No.: PCT/EP02/00228
§ 371 (c)(1),
(2), (4) Date: Sep. 11, 2002

(87) PCT Pub. No.: WO02/061313
PCT Pub. Date: Aug. 8, 2002

(65) Prior Publication Data
US 2003/0107018 A1 Jun. 12, 2003

(30) Foreign Application Priority Data
Jan. 11, 2001 (DE) ..................................... 201 00 471 U

(51) Int. Cl.[7] ............................................... F16K 31/06
(52) U.S. Cl. ................................ 251/129.17; 251/129.2
(58) Field of Search ....................... 251/129.01–129.22

(56) References Cited
U.S. PATENT DOCUMENTS 5,139,226 A    8/1992   Baldwin et al.
5,205,323 A  * 4/1993   Baker ....................... 251/129.2
5,282,604 A  * 2/1994   Wade ...................... 251/129.17
5,653,422 A    8/1997   Pieloth et al.
5,762,097 A    6/1998   Hettinger et al.
6,000,677 A  * 12/1999  Cook et al. ............. 251/129.07
6,003,552 A  * 12/1999  Shank et al. ........... 251/129.15

FOREIGN PATENT DOCUMENTS

DE       33 34 159 A1    4/1985
DE       37 39 048 A1    5/1989
DE      197 18 408 A1    5/1998

OTHER PUBLICATIONS

International Search Report, Nov. 1, 2002, 3 pages.

* cited by examiner

Primary Examiner—Paul J. Hirsch

(57) ABSTRACT

The microvalve comprises a drive housing (3) in which a magnetic drive is arranged that includes a solenoid (1) and an armature (6) adapted to be actuated by the solenoid. A flanged housing (2) in which two valve seats (10a, 10b) are formed is mounted against the drive housing. Arranged between the drive housing (3) and the flanged housing (2) is a diaphragm (5) which is adapted to be pressed against the valve seats by means of a commutation rocker (4) coupled to the armature. The commutation rocker (4) has a pivot bearing, the axis (13) of which, for avoiding tolerances, assumes a position which is determined by direct abutment on a seating surface of the flanged housing (2) facing the drive housing (3).

14 Claims, 2 Drawing Sheets

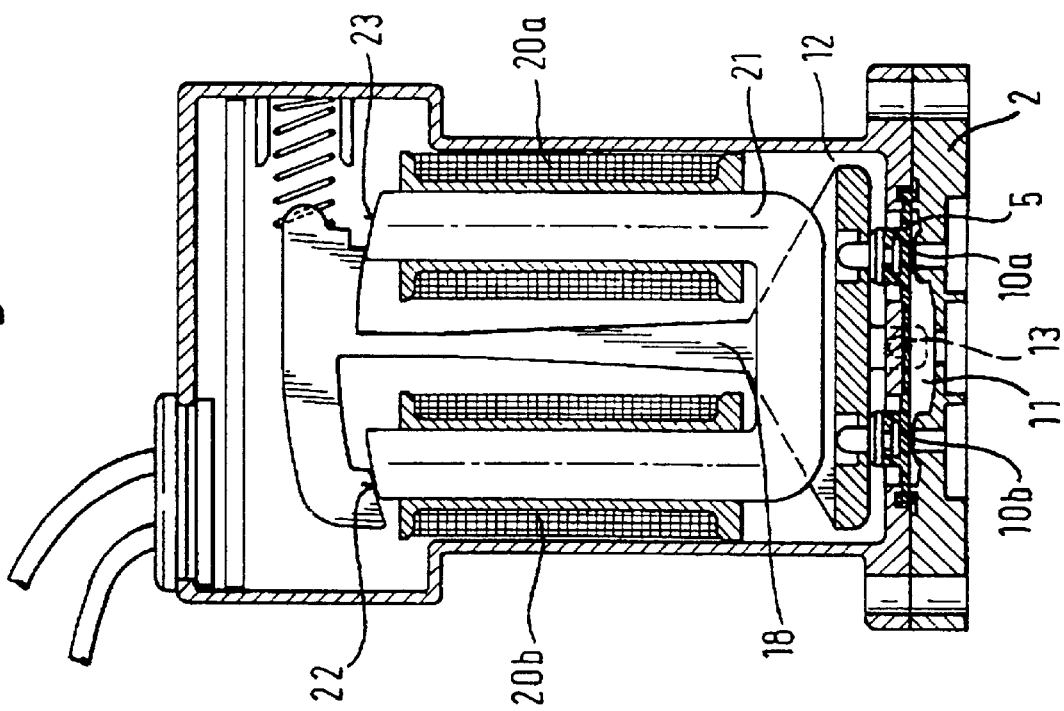
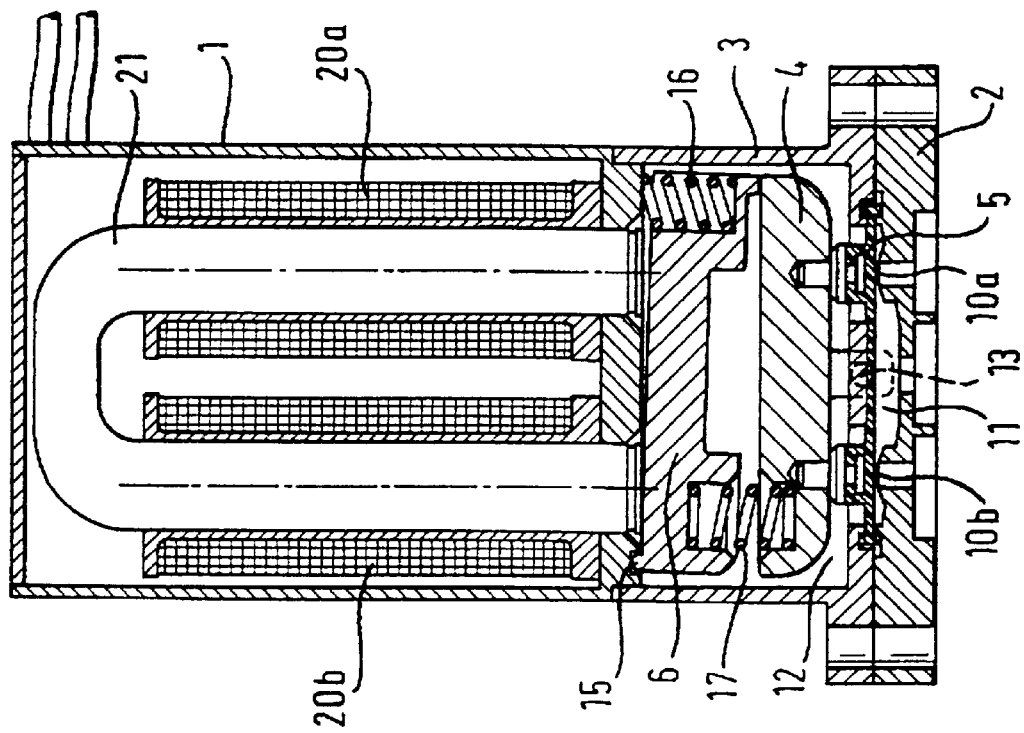

MICRO-VALVE

The invention relates to a microvalve comprising a drive housing in which a magnetic drive is arranged that includes at least one solenoid and an armature adapted to be actuated by the solenoid, a flanged housing which is mounted against the drive housing and in which at least one valve seat is formed, and a diaphragm arranged between the drive housing and the flanged housing, which diaphragm is adapted to be pressed against the valve seat by means of a commutation rocker coupled to the armature.

In a microvalve, any manufacturing tolerances have a more aggravating effect the more compact the valves are by design, because the actuation forces that are obtainable by the drive of the valve, preferably a solenoid, are greatly reduced with an increasingly smaller constructional volume, whereas the manufacturing tolerances of the components increase in relative terms.

The invention provides an extremely compact microvalve in which tolerances are avoided in particular at the interface between drive and commutation rocker, in order to achieve a further miniaturization with as unchanged technical specifications and low production costs as possible.

According to the invention, the commutation rocker has a pivot bearing, the axis of which assumes a position which is determined by direct abutment on a seating surface of the flanged housing facing the drive housing. Thus, the component and manufacturing tolerances are eliminated, which would be inevitable in case the commutation rocker is supported in or on the drive housing.

In advantageous further developments of the invention, in spite of a reduced constructional volume of the microvalve, the commutation forces that can be obtained are increased owing to an optimum utilization of space and a deliberate arrangement of solenoids and iron yoke; hence, the performance data of the next larger valve type are achieved or even excelled.

In addition, in the preferred embodiment of the microvalve the space that is in contact with the medium is hermetically separated from the drive part by the diaphragm, whereby due to the flexing resistance showing an effect during the actuation of the diaphragm there is an additional increase in actuation forces that are required.

In a first design of the microvalve the armature is not mounted in the drive housing, as with known designs, but is pivotally mounted directly on or in the solenoid, whereby the friction counteracting its pivoting motion is reduced.

In a second design of the microvalve the armature is formed in one piece with the commutation rocker and thereby is supported together with the rocker on the seating surface of the flanged housing, whereby further component and manufacturing tolerances as well as friction between armature and commutation rocker are avoided.

Further features and advantages of the invention will be apparent from the following description and the accompanying drawings. In the drawings:

FIG. 1 shows the overall construction of the microvalve in a sectional view, in a version with the commutation rocker and the armature as separate components;

FIG. 4 shows the overall construction of the microvalve in a sectional view, in an embodiment with the commutation rocker and the armature as a one-piece component.

Figure 2:
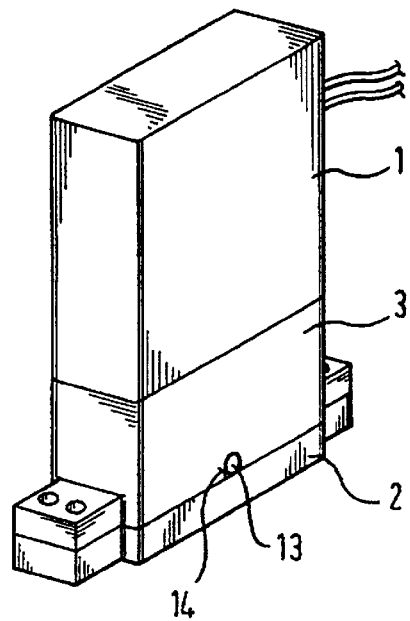
FIG. 2 is a perspective view of the microvalve.
Figure 2A:
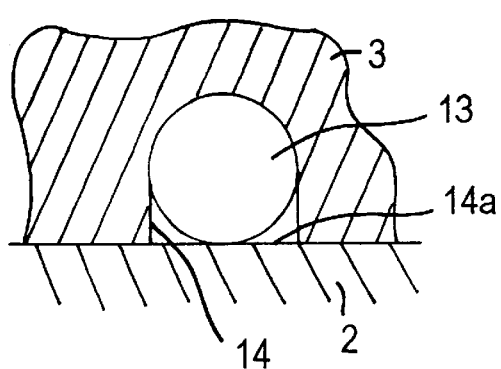
FIG. 2a is a detail view showing a bearing recess in the drive housing and a seating surface on the flanged housing.
Figure 3:
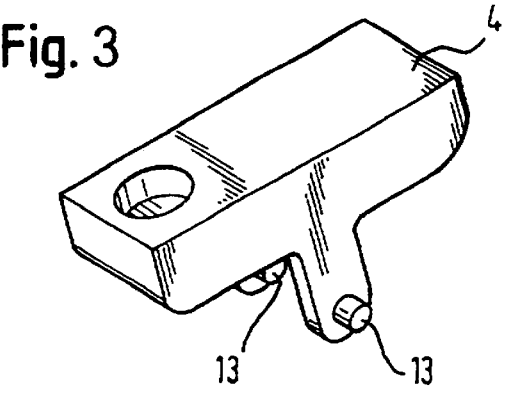
FIG. 3 is a detail view showing a commutation rocker including a bearing pin.

In the embodiment shown in FIGS. 1 to 3, the microvalve consists of a solenoid 1, a flanged housing 2, a drive housing 3, a commutation rocker 4, a diaphragm 5 and an armature 6. Valve seats 10a, 10b are incorporated in the flanged housing. The diaphragm 5 separates the part of the valve 11 that is in contact with the medium, from the drive part 12. The diaphragm is actuated through the commutation rocker that comprises two bearing pins 13 which are held in a semicircular recess 14 on the bottom side of the drive housing and which directly rest on a seating surface 14a of the flanged housing 2. The armature 6 mounted in a pivot bearing 15 exerts a force on the commutation rocker 4 by means of a compression spring 16. This force presses the diaphragm 5, which is connected with the commutation rocker, onto the valve seat 10a located in the flanged housing and thereby closes the valve seat. When applying a voltage to the solenoid 1, there is produced a magnetic force which causes a pivoting motion of the armature 6. The armature 6 releases the commutation rocker 4 which, for its part, biased by a second compression spring 17, performs a pivoting motion and lifts the diaphragm 5 off from the normally closed valve seat 10a and, on the other hand, closes the normally open valve seat 10b.

In order to avoid any tolerances, the commutation rocker in the present invention is not mounted as usual via a bearing pin in a bore provided in the drive housing, but the bearing pins 13 of the commutation rocker 4 lie directly on the seating surface 14a of the flanged housing 2 into which the valve seats are incorporated. Thereby, the tolerances caused by an additional bore in the drive housing are eliminated. Further, the distance between the pivot of the commutation rocker and the top edge of the valve seats is thereby reduced, so that the diaphragm in sealing off the two valve seats performs a much smaller transverse movement on the valve seats than is the case with known designs with a bore in the drive housing for supporting the commutation rocker, this reducing the diaphragm actuation forces which are required for sealing off the valve seats.

In the second embodiment of the microvalve, as illustrated in FIG. 4, the commutation rocker and the armature are combined to form a single rotary armature 18. The drive has a U-shaped yoke 21, the web of which faces the flanged housing 2. The rotary armature 18 is mounted in the same way as the commutation rocker 4 in the first embodiment. Further, the rotary armature 18 generally has the shape of a hammer, comprising a shank which is rigidly connected with the commutation rocker and extends between the legs of the yoke, as well as a hammer head which has pole faces which are opposite the free end faces 22, 23 of the legs of the yoke; these pole faces are curved like the end faces with a radius that corresponds to the distance from the axis of the pivot bearing of the commutation rocker. One solenoid 20a, 20b each is slipped on the two legs of the yoke. As soon as current flows through the two solenoids 20a, 20b, there is produced a magnetic field in the yoke 21, which magnetic field strives to move the rotary armature—that is deflected in the position of rest—so as to overlap with the two legs of the yoke, whereby a torque is produced in the rotary armature that, in turn, moves the diaphragm 5. The course of the torque versus the angle of rotation can be varied by an appropriate design of the faces 22, 23, lying opposite each other during the rotary motion, of rotary armature and yoke, whereby besides the opening and closing function of the valve also a rotary angle of the rotary armature can be achieved which is approximately proportional to the current intensity applied, so that the valve can also be used as a closed-loop control valve. As compared with known rocker valves and with the functional principle described above, in which an armature supported in a pivot transmits a rotary motion to the commutation rocker, with the point of contact between armature and commutation rocker naturally involving friction, no additional friction losses are produced in this embodiment except in the bearing point of the rotary armature; moreover, the valve thereby commutates almost without any noise.

For producing the magnetic force, the solenoids 20a, 20b slipped on the yoke 21 that is bent in the shape of a U, are preferably connected in series in order to make optimum use of the rectangular constructional space predetermined by the fluidic principle and to keep the width dimension of the valve as small as possible. For a further enhancement of the performance data of the valve, both solenoids can be connected in parallel for a short time during the commutation process of the valve by an appropriate electronic circuitry. With this, a short-term increase in the magnetic force is achieved that is sufficient to attract the armature. As soon as the armature 6 has been attracted by the solenoid 1, the magnetic force of the magnet is greatly increased due to the small air gap between the armature and the solenoid, and the two solenoids may again be connected in series thereafter, to avoid an excessive heating.

What is claimed is:

1. A microvalve comprising a drive housing in which a magnetic drive is arranged that includes at least one solenoid and an armature adapted to be actuated by the solenoid, a flanged housing which is mounted against the drive housing and in which at least one valve seat is formed, and a diaphragm arranged between the drive housing and the flanged housing, which diaphragm is adapted to be pressed against the valve seat by means of a commutation rocker coupled to the armature, wherein the commutation rocker has a pivot bearing, the axis of which assumes a position which is determined by direct abutment on a seating surface of the flanged housing facing the drive housing.

2. The microvalve according to claim 1, wherein the commutation rocker has at least one bearing pin supported on the seating surface of the flanged housing.

3. The microvalve according to claim 1, wherein the seating surface of the flanged housing is substantially planar.

4. The microvalve according to claim 1, wherein the pivot bearing has guidance faces for radial guiding which are jointly formed by the seating surface of the flanged housing and by seating surfaces of the drive housing.

5. The microvalve according to claim 1, wherein the armature is connected with the commutation rocker or formed in one piece therewith and is supported by it.

6. The microvalve according to claim 5, wherein the magnetic drive has a U-shaped yoke including a web facing the flanged housing and two legs that are connected by the web, the armature generally has the shape of a hammer and comprises a shank which is rigidly connected with the commutation rocker and extends between the legs, and a hammer head linked to the free end of the shank, the hammer head including pole faces which are opposite the free end faces of the legs.

7. The microvalve according to claim 6, wherein the pole faces of the hammer head and the free end faces of the legs are curved along a circular arc about the axis of the pivot bearing.

8. The microvalve according to claim 6, wherein the armature is biased into a position of rest by means of a compression spring which is supported between the inner surface of the drive housing and the hammer head of the armature.

9. The microvalve according to claim 6, wherein the shank is configured so as to be tapered from the commutation rocker towards the hammer head.

10. The microvalve according to claim 1, wherein the magnetic drive has a U-shaped yoke including a web facing away from the flanged housing and two legs connected by the web, the armature is pivotally mounted in opposing arrangement to the free ends of the legs of the yoke and the armature is coupled with the commutation rocker by means of a compression spring.

11. The microvalve according to claim 10, wherein the armature is biased into a position of rest by means of a compression spring.

12. The microvalve according to claim 6, wherein a solenoid is mounted on each leg of the U-shaped yoke and the solenoids can be operated for a short time in electrical parallel connection for generating a commutation force, and can be operated in series connection for generating a holding force.

13. The microvalve according to claim 2, wherein the seating surface of the flanged housing is substantially planar.

14. A method of operating a microvalve according to claim 6, wherein the electrical current intensity delivered to the solenoids is controlled in a closed loop in response to the pivot angle of the armature.

* * * * *